United States Patent [19]

Cuvillier et al.

[11] 4,048,069
[45] Sept. 13, 1977

[54] SMALL SURFACE LIQUID DECANTATION APPARATUS AND PROCESS FOR MAKING SAME

[75] Inventors: Roger Cuvillier, Darvoy Jargeau (Loiret); Richard Cohen-Alloro, Olive (Loiret), both of France

[73] Assignee: Bureau de Recherches Geologiques et Minieres, France

[21] Appl. No.: 654,605

[22] Filed: Feb. 2, 1976

[51] Int. Cl.² ............................................. B01D 21/10
[52] U.S. Cl. ...................................... 210/84; 210/522
[58] Field of Search ................... 210/83, 84, 513, 521, 210/522

[56] References Cited

U.S. PATENT DOCUMENTS

| | | | |
|---|---|---|---|
| 1,030,271 | 6/1912 | Arbuckle | 210/521 |
| 2,134,113 | 10/1938 | Ehle | 210/522 X |
| 3,067,878 | 12/1962 | Genter et al. | 210/521 X |

Primary Examiner—William A. Cuchlinski, Jr.
Attorney, Agent, or Firm—Diller, Brown, Ramik & Wight

[57] ABSTRACT

The invention relates to a small surface liquid decantation apparatus and process for making same.

The decantation apparatus consists of a main tank of revolution (1) with a central inlet (8), an exhaust (3) of the decanted products by the bottom and an exhaust (13) on the upper peripheral edge for the purified liquid. The main body (1) comprises annular compartments defined laterally by coaxial walls of revolution (4 to 7) and in communication with the lower portion of the main body (1), provided with an exhaust (3). An indented zone (11, 13 to 17) forming an overflow channel for exhausting the upper layer of purified liquid is provided in the upper edge of each wall (4 to 7). Said indented zones (11, 13 to 17) are substantially diametrically opposite each other from one wall to the next.

Current applications for decantation.

21 Claims, 7 Drawing Figures

U.S. Patent  Sept. 13, 1977  Sheet 1 of 3  4,048,069
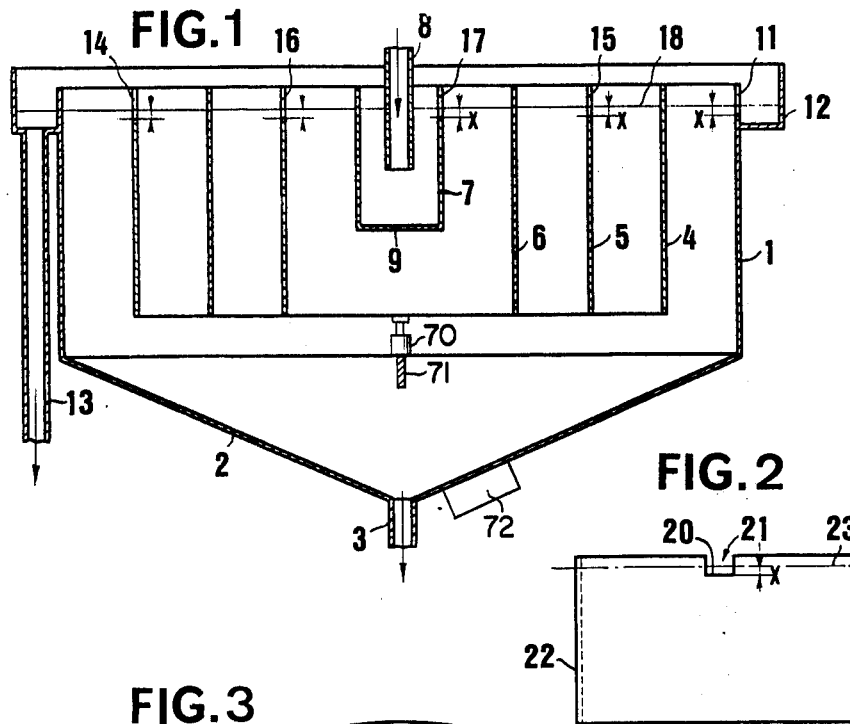
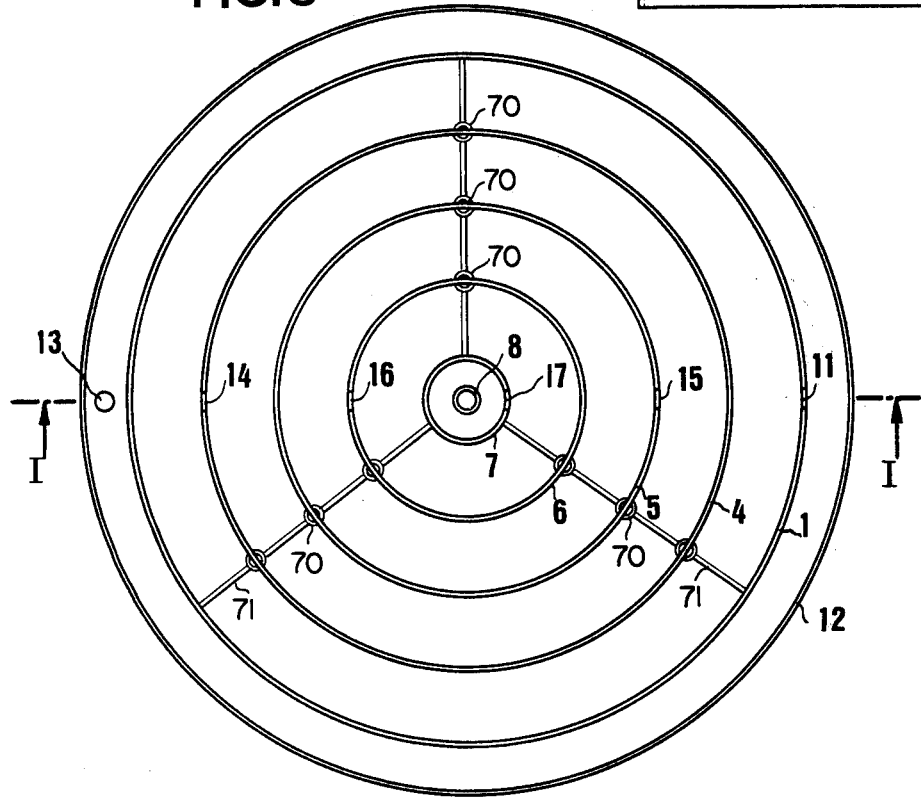

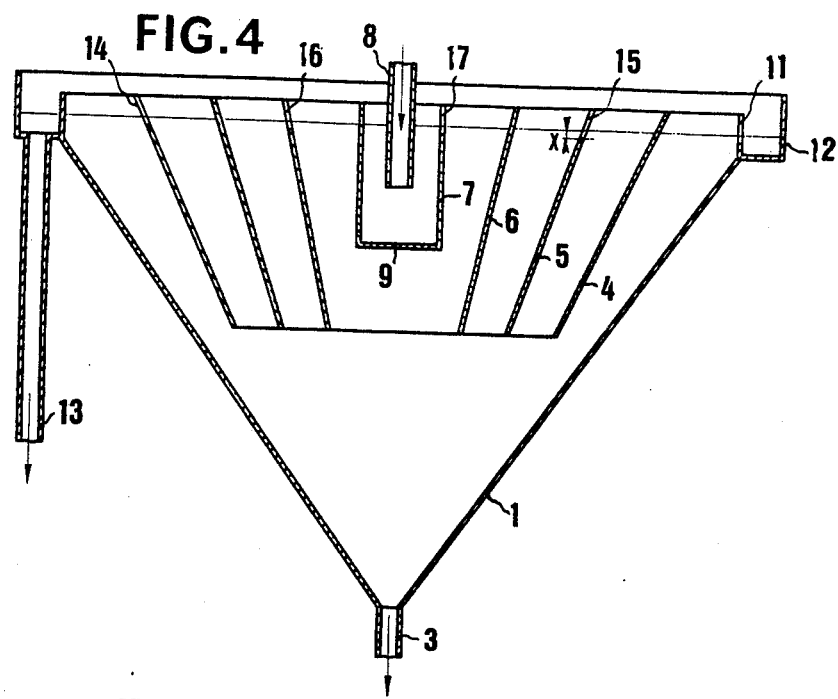
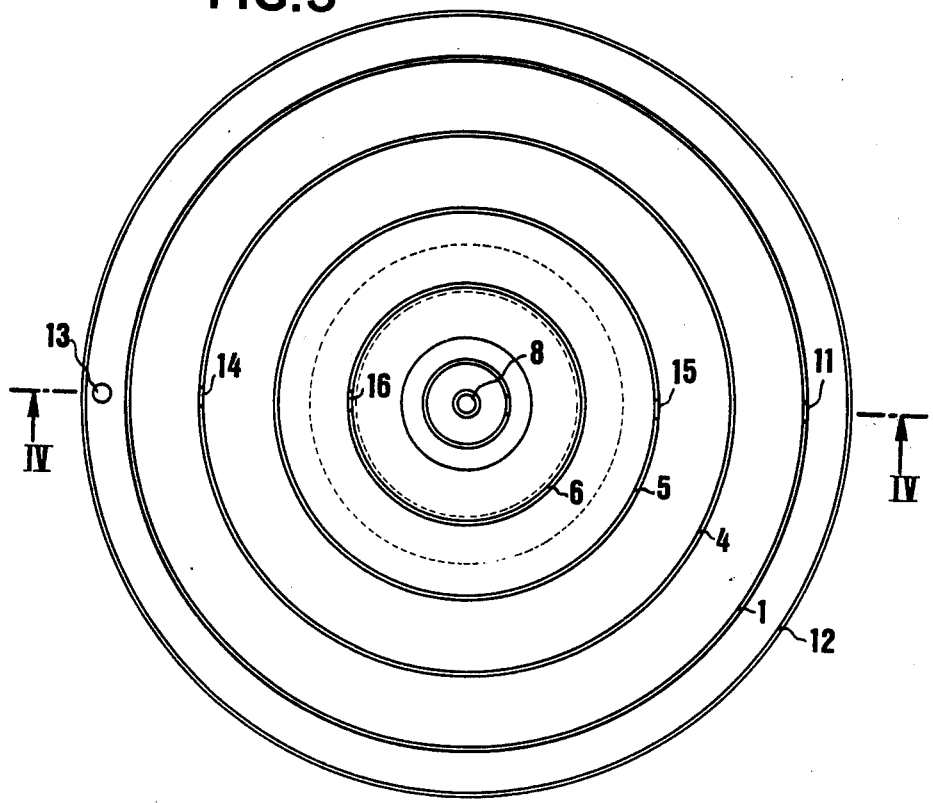

SMALL SURFACE LIQUID DECANTATION APPARATUS AND PROCESS FOR MAKING SAME

The present invention relates to a process for the decantation of solids in suspension in a liquid in the form of free or clumped particles, the said process making it possile to effect separation in a very reduced surface. The invention relates to the apparatus for the embodiment of said process.

It is known that in general, the apparatus already known for decantation are very large in order to be effective, whether said apparatus are completely static or have the product drawn off by the bottom, with a scraper arm or without one. The most simple and best known of said liquid decantation apparatus is the decantation tank generally composed of one or more elements. It has a very large surface area, and industries therefore have large unproductive areas in their precincts, and it further requires costly handling and emptying operations.

Another well known and more elaborate apparatus is the rake decanter. It is relatively large and costly.

Other known apparatus have been described; it may be referred to patents; FR Pat. No. 1,354,397 and DT Pat. No. 421 266.

As it is increasingly necessary to combat pollution, it is important to be able to obtain a moderately priced apparatus for purifying water or other liquid and which takes up very little space.

The aim of the invention is to overcome the drawbacks of the known apparatus by providing a small surface decantation apparatus.

To this end, the object of the invention is a liquid decantation process, characterized in that a liquid, holding in suspension particles having a density greater than the density of the liquid, is delivered continuously to the center of a revolution space which is already full of liquid, and wherein the liquid mass is prevented from moving radially, to encourage vertical decantation of the dense particles while causing a surface layer of the liquid to move horizontally whereby each unit volume of said layer follows a spiral pathway moving progressively from the center to the periphery following several spiral fractions, either in a same direction of rotation, or, with or without periodical reversal of their directions of rotation, and in that said surface layer is removed at the periphery of said space of revolution and the dense particles at the lower portion of said space.

The invention also relates to a small surface liquid decantation apparatus consisting of a main revolution tank, with central intake, an exhaust of the decanted products by the bottom and an exhaust on the upper peripheral edge for the purified liquid, characterized in that the main body comprises annular compartments laterally defined by coaxial walls of revolution and in communication with the lower portion of the main body, provided with exhaust for the decanted products, at least one indented zone forming an overflow channel for exhausting the upper layer of purified liquid being formed in the upper edge of each wall, the said indented zones being substantially diametrically opposite from one wall to the next.

According to the invention, the surface layer is exhausted from the space of revolution, at a point of its periphery, over a portion thereof or over its entire length.

When exhausting is effected at a single point or over a limited portion of the periphery, the exhaust point is selected whereby a fictitious point of the surface layer covers the longest distance between said point and the opposite indentation; such a point will preferably be situated diametrically opposite the indentation.

Other advantages and characteristics of the invention will be brought out in the following description, given as a non-limiting example, with reference to the appended drawings in which:

FIG. 1 is a schematic vertical view, with cross section along line I—I of FIG. 3 of the decantation apparatus of the invention;

FIG. 2 is a vertical view of an indentation in a ring of the decantation apparatus of FIG. 1;

FIG. 3 is a plane view of the apparatus of FIG. 1;

FIG. 4 is a cross section along line IV—IV of FIG. 5 of a truncated ring decantation apparatus of the invention;

FIG. 5 is a plane view of the truncated ring apparatus of FIG. 4;

Figure 6:
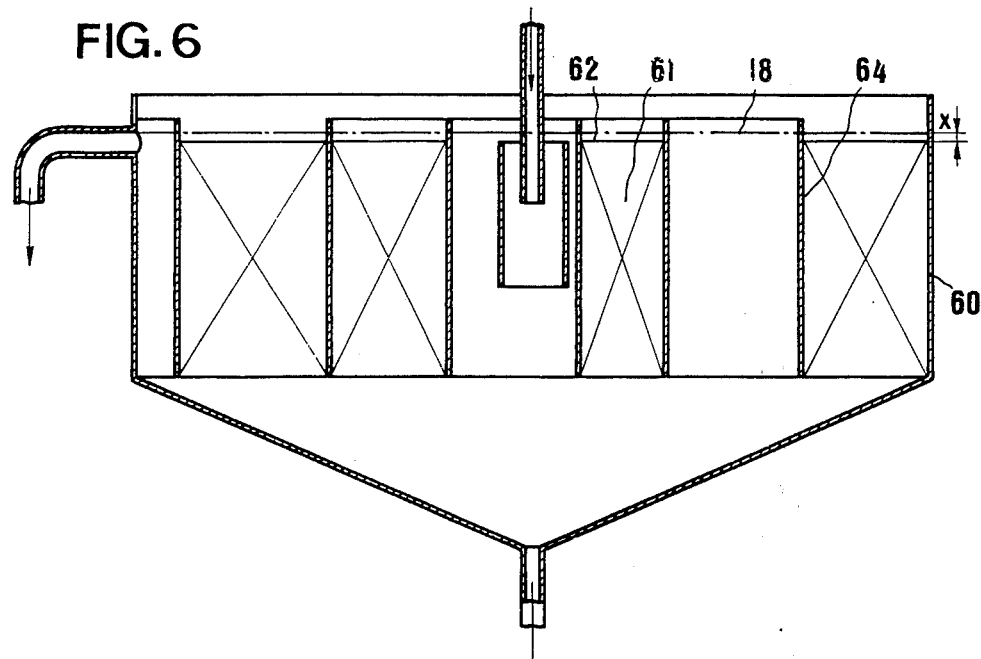
FIG. 6 is a cross section along line XIII—XIII of FIG. 7.

FIG. 1 shows an apparatus according to the invention comprising a cylindrical body 1 with conical base 2. The summit of the conical base 2 comprising an orifice opening onto a cylindrical pipe 3 permitting removal of the decanted products. Said decanted products can be removed by a simple valve (not shown) or a valve combined with a rotating rake device (not shown), or help with a vibrator (not shown, and described further).

The decantation apparatus comprises several concentric cylindrical rings 4, 5, 6 and 7. The smallest diameter ring 7 has a closed bottom 9. A feed pipe 8 open approximately into the center of ring 7 with a closed bottom. Rings 4, 5 and 6 do not extend downwardly to the bottom of the main body 1. The lower edges of cylindrical rings 4, 5 and 6 are situated on one or more planes but should leave a sufficiently large free space between said rings and the conical bottom 2. The closed bottom 9 of ring 7 is, in the mode of embodiment shown, situated at a higher level than the lower edges of rings 4, 5 and 6, but this arrangement is in no way critical.

Each cylindrical ring (4, 5, 6 and 7) and the main body 1 has an exhaust localized at the upper portion of each cylinder, disposed in such a way that the exhausts of two concentric cylinders are diametrically opposite each other.

The exhausts generally consist of rectangular indentations (FIG. 2). The depth of said indentations is such that the lower edge 20 of an indentation 21 of a cylindrical ring 22 (shown FIG. 2) is at a lower level than the water level 18 by a value X.

As is shown in FIGS. 1 and 3, each cylindrical ring 7, 6, 5, 4 and 1 comprises a single indentation 17, 16, 15, 14 and 11 respectively. Two consecutive cylinders 7 and 6, 6 and 5, 5 and 4, 4 and 1 have their respective indentations 17 and 16, 16 and 15, 15 and 14, 14 and 11 disposed on a same diameter, but in opposition with respect to the center.

In this case, the main cylindrical body 1 is provided with an exterior peripheric gutter 12 on the upper periphery thereof.

In the diametrically opposite direction to indentation 11 of the cylindrical body 1, the bottom of gutter 12 comprises an orifice opening onto an exhaust pipe 13.

It can also be envisaged that the indentation farthest from the center, designated by 11 in FIGS. 1 and 3, be situated vertically above an exhaust 13 and that gutter 12 will thus be done away with.

The liquid to be decanted, water for example, arrives by feed pipe 8 in the closed bottom cylindrical ring 7. The feed rate of the water is adjusted so that the level of the water registered in 18 is slightly higher than the level of the lower edge of indentations 11 and 14 to 17.

The feed water is exhausted by indentation 17 of ring 7 and arrives in the first decantation zone situated between the outer walls of ring 7 and the inner walls of ring 6.

The fluid circulates in two half-rings directed toward indentation 16. Decantation is similar to that observed in a test tube, that is to say, it is vertical, as the solids in suspension in the water fall and cannot move in a radial direction as they come up against wall 6. The solids can only fall to the point 3 of the conical bottom 2 as, bearing in mind the fact that the liquid is not turbulent, they cannot rise.

The upper portion of the liquid has a clarified zone. Said zone is "scalped" when it passes into the space between walls 6 and 5 through indentation 16. In FIGS. 1 and 2, mark X shows the height of scalping corresponding to the difference between the level of fluid 18 and the level of the lower edge 20 of an indentation. Water penetrate into the second decantation zone between walls 6 and 5; as the fluid pathway along the two half-rings is longer, the decantation time increases and the upper layer is purified to a higher degree. It may also be noted that a big part of the unit volumes overflowing from the first decantation zone between walls 7-6 to said second decantation zone is submitted to reverse the direction of the rotation. This reversing of the current direction makes the result of the decantation much better because each unit volume is thus subject to a reduced radial component. By the same process, consisting in scalping the upper portion of the water when the fluid passes from annular compartment 5-6 to annular compartment 4-5 by indentation 15, then from annular compartment 4-5 to annular compartment 1-4 by indentation 14, the surface layer of fluid is purified to an increasing extent by passing from one annular compartment to another along the longest pathway with or without a periodical change in the directions of rotation owing to the fact that the passing indentations are positioned opposite to one another until exhaust 13 of the clarified liquid passing through indentation 11.

The solid particles in suspension in the liquid fall, without being able to rise, and fall onto the bottom 2 towards the point of the cone. Said solid particles can be free from one another or clumped by flocculation. The decanted products are exhausted through pipe 3, either by gravity or by continuous or intermittent pumping.

According to another mode of embodiment, the device according to the invention can be a device with frustoconical rings with indentations positioned opposite one another. Said device shown in FIGS. 4 and 5 is arranged in the same manner as the device shown in FIGS. 1 and 3, except that the rings or walls 1, 4 and 5 are frustoconical instead of being cylindrical.

Figure 7:
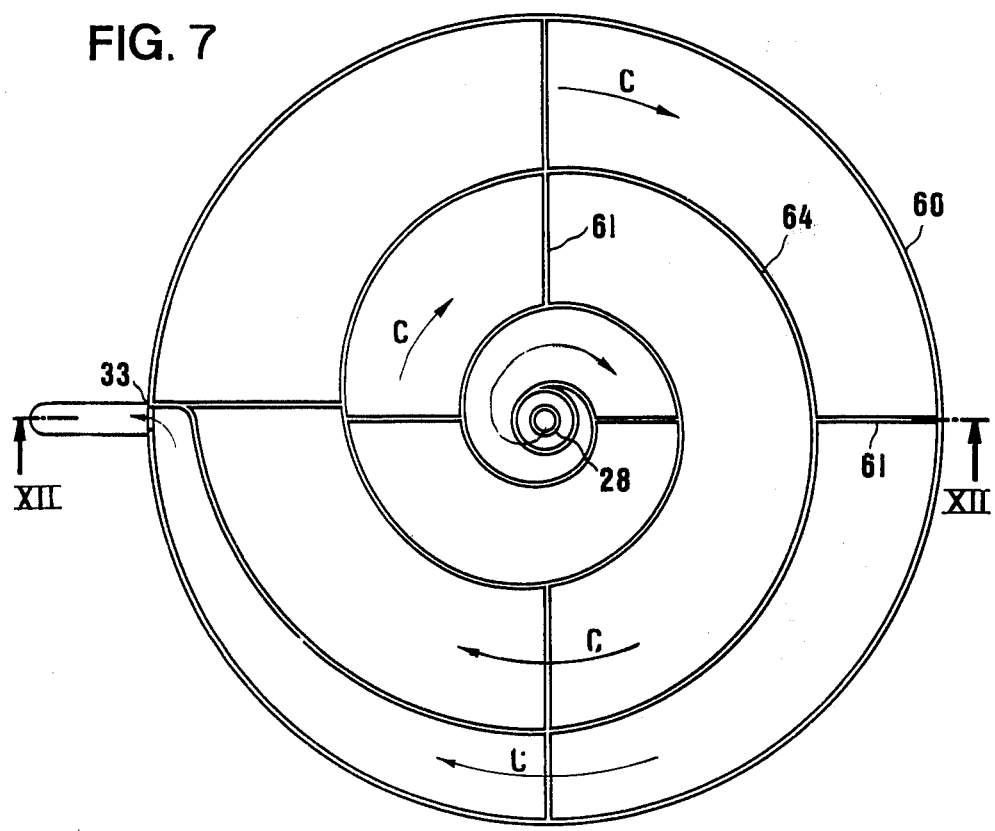
FIG. 7 is a diagram of a plane view of a decantation apparatus with a spiral upper circuit and with radial partitions.

Another mode of embodiment of the device of the invention is shown in FIGS. 6 and 7. The device has a spiral upper circuit and radial vertical walls provided along the spiral pathway.

FIGS. 6 and 7 show a decantation device with vertical spiral walls 64, a cylindro-conical tank 60, and provided with radial vertical partitions 61. Obviously, a corresponding spiral wall decantation apparatus provided with radial vertical walls may comprise a conical tank or main body, (not represented). The radial partitions 61 are positioned on the spiral pathway defined by wall 64. Said partitions 61 are slightly immersed and act as a barrier to the particles in suspension in the water by reducing the tangential component according to arrow C. The radial partition 61 only allows the upper layer of purified liquid to flow over, in the direction of arrows C. Any number of said partitions may be placed in any position.

The greater is the number of partitions 61 and the closer is the level of the upper edge 62 of said partitions to water level 18, the more vertical is the decantation, that is to say, that the movement of the particles in suspension is substantially vertical downwards.

A device may be provided making it possible to vary the height of radial partition 61. It is advantageous to be able to adjust the height of the purified layer to be "scalped" by partitions 61 as a function of different decantation velocities.

A mode of embodiment of such an adjustment device is a star-shaped device, with three arms for example, bearing on the edges of the main body. The arms are connected to the upper edge of each partition by a screw or jack; each partition can thus be adjusted individually.

Said partition height adjustment device can be adapted to decantation apparatus with indented annular walls as shown in FIGS. 1 and 3 wherein conventional jacks 70 are provided for each of the cylindrical rings 4, 5 and 6, the jacks being carried by support arms 71. The arms of the device are connected by screws or jacks to the various rings, the height of which can be adjusted individually. The level of each of the various indentations can be selected and adjusted.

The preferred embodiment according to the invention is provided with a conventional vibrator 72.

This vibrator preferably rotative or alternative is applied on the point or bottom of the conical or cylindroconical tank and give rise to vibrations in the whole apparatus in the horizontal plane and the vertical plane.

This vibrator is used to harden the decanted products or flakes, to accelerate the compacting of the product deposited on the bottom and to reduce the compacting field. All this characteristics due to the vibrating means make that the decantation is quicker and better.

The invention is obviously not limited to the modes of embodiment shown and described hereinabove but, on the contrary, it covers all variations, notably those concerning the general shape of the main body, the arrangement of the spiral wall or the shape of the indentation in the annular walls, and the possibility of a device for adjusting the height of the partitions.

What we claim is:

1. A small surface liquid decantation apparatus comprising a main revolution tank, with a central inlet, an exhaust for the products decanted by the bottom and an exhaust on the upper peripheral edge for the purified liquid, wherein the main body comprises arcuate compartments defined at least in part by adjacent arcuate walls and in communication with the lower portion of the main body, provided with the exhaust for the decanted products, at least one indented zone, forming an overflow channel for exhausting the upper layer of purified water, being formed in the upper edge of a wall of each compartment, the said indented zones being circumferentially spaced from one compartment to the next.

2. A small surface liquid decantation apparatus according to claim 1, wheein said main body has a tapered bottom, and a vibrating means is applied on the tapered bottom of the main body.

3. A small surface liquid decantation apparatus according to claim 1 wherein said adjacent arcuate walls are coaxial walls of revolution, said compartments are annular, and said indented zones are diametrically opposite each other from one compartment to the next.

4. A small surface liquid decantation apparatus according to claim 3, wherein the main body of revolution is a conical tank.

5. A small surface liquid decantation apparatus according to claim 3, wherein the main body of revolution is a cylindro-conical tank.

6. A small surface liquid decantation apparatus according to claim 3, wherein the coaxial walls of revolution are vertical.

7. A small surface liquid decantation apparatus according to claim 3, wherein means are provided to permit the height of each wall of revolution to be adjusted individually.

8. A small surface liquid decantation apparatus according to claim 7, wherein the main body of revolution is a conical tank.

9. A small surface liquid decantation apparatus according to claim 7, wherein the main body of revolution is a cylindro-conical tank.

10. A small surface liquid decantation apparatus according to claim 7, wherein the coaxial walls of revolution are vertical.

11. A small surface liquid decantation device according to claim 3, wherein exhausting is effected over a limited portion of the periphery, the position of the exhaust being selected whereby a unit volume of the surface layer passes along the longest pathway between the said position and the opposite indentation, such a position being preferably situated in a zone diametrically opposite the indentation.

12. A small surface liquid decantation apparatus according to claim 1 wherein said adjacent walls are in the form of a continuous spiral wall, and said walls having an indented zone are radial walls.

13. A small surface liquid decantation apparatus consisting of a main body of revolution with a central inlet, an exhaust for the decanted products by the bottom and an exhaust of the purified liquid on the upper peripheral edge of said body, the upper portion of the main body comprising a spiral wall connecting the inlet to the exhaust of the purified liquid, wherein said exhaust is localized on the substantially circular upper peripheral edge of the main body; the spiral wall is vertical; and radial partitions are positioned on the spiral pathway defined by the said wall, the upper edge of said radial partitions being below the water level.

14. A small surface liquid decantation apparatus according to claim 13, wherein means are provided to permit the height of each radial partition to be adjusted individually.

15. A small surface liquid decantation apparatus according to claim 13, wherein said main body has a tapered bottom, and a vibrating means is applied on the tapered bottom of the main body.

16. A liquid decantation process comprising the steps of providing a space of revolution filled with a liquid mass, continuously delivering to the center of the space of revolution and into the liquid mass a liquid holding in suspension particles having a density greater than the density of the liquid, presenting the movement of the liquid mass in a radial direction and effecting vertical decantation of the dense particles, and at the same time providing for movement of a surface layer of the liquid generally in a horizontal plane with each unit volume of the liquid in the surface layer progressively moving from the center of the space of revolution to an exhaust at the periphery of the space of revolution while controlling the path of movement of each unit volume of the liquid in the horizontal plane to be along successive spiral fractions, and removing the dense particles from a lower portion of the space of revolution.

17. A liquid decantation process according to claim 16, wherein the surface layer is exhausted from the periphery of the space of revolution along its entire length.

18. A liquid decantation process according to claim 16 wherein the movement of each unit volume along successive arcuate fractions includes a change of direction.

19. A liquid decantation process according to claim 18, wherein the change in the direction of rotation of each unit volume of the surface layer is periodical.

20. A liquid decantation process according to claim 3, wherein the surface layer is exhausted from the periphery of the space of revolution along its entire length.

21. A liquid decantation process according to claim 20, wherein the surface layer is exhausted from the periphery of the space of revolution along its entire length.

* * * * *